Aug. 26, 1958  B. A. NOBLE ET AL  2,849,114
APPARATUS FOR INSPECTING AND CLASSIFYING GLASS CONTAINERS
Filed July 16, 1956  2 Sheets-Sheet 1

Inventors:
BURTON A. NOBLE
JOSEPH F. SCHLESINGER
By Rule + Hoge
Their Attorneys

Aug. 26, 1958 B. A. NOBLE ET AL 2,849,114
APPARATUS FOR INSPECTING AND CLASSIFYING GLASS CONTAINERS
Filed July 16, 1956 2 Sheets-Sheet 2

INVENTORS
BURTON A. NOBLE
JOSEPH F. SCHLESINGER
BY
ATTORNEYS

//2,849,114
Patented Aug. 26, 1958

United States Patent Office

2,849,114
APPARATUS FOR INSPECTING AND CLASSIFYING GLASS CONTAINERS

Burton A. Noble, Oakland, and Joseph F. Schlesinger, Alameda, Calif., assignors to Owens-Illinois Glass Company, a corporation of Ohio Application July 16, 1956, Serial No. 597,932

6 Claims. (Cl. 209—74)

The present invention relates to apparatus for inspecting glass containers and more particularly is concerned with the provision of simple and effective means for classifying and grouping defective glass containers as dictated by the specific kind or character of defect that has been detected by the inspecting mechanism.

Defects to the extent that they manifest themselves in newly formed glass bottles and jars generally fall in one of two main classifications. One type includes, as examples, out-of-round neck openings and sealing surfaces as well as bent necks and the like imperfections and these may be detected by purely mechanical gauging devices such as gauge plugs insertable in the neck openings and gauge rollers designed for contact with the neck wall of a rotating container. The other classification with which we are vitally concerned includes crizzles, checks and such imperfections which can reliably be detected only by optical checking through the use of apparatus utilizing photoelectric devices, prisms, etc. Frequently glass containers determined to be defective by such photoelectric devices will, upon further inspection, be found to be marketable. It is for this reason, among others, that grouping or classifying of the defective ware according to the specific character of the defects is most desirable. It has proved in practice to be a means for saving a substantial amount of glassware from the "cullet" pile.

An important object of our invention is the provision of microswitches individual to accumulator tables designed to receive defective ware and actuating devices arranged at regular spaced intervals along a ware conveyor for selectively operating the microswitches in such fashion that all glassware having defects falling in a particular classification or group will be transferred to the same table or accumulator.

Another object is the provision of a series of bottle or jar supporting cradles which move intermittently to bring the containers in succession to a plurality of inspecting stations at each of which the glass article is inspected for a specific kind of defect and at each of which stations there is a device for properly setting the microswitch actuator as determined by the kind of defect (if any) present in the article.

It is also an object of our invention to provide two specific forms of apparatus for setting the microswitch actuator so that the latter will be placed in one operating position if the ware contains defects of the kind falling in one major group and will place said actuator in another position to operate a second microswitch in the event the defect happens to fall in a second group or classification. To this end electrically operated solenoid units are positioned at the several inspecting stations to pre-position the fingers or lobes of the microswitch actuators, one of the fingers being positionable to operate one of the microswitches, or to position the other or second finger so that at the proper time it will actuate the other microswitch. Obviously if the articles being inspected do not contain any defects the fingers remain in neutral positions and do not contact either of the microswitches. In that event, the glassware is conveyed directly to the packing station.

Other objects will be in part apparent and in part pointed out hereinafter.

In the drawings:

Fig. 5 shows the neutral position of the actuator while Fig. 6 shows one of the fingers in operative position and momentarily securely held by the solenoid unit against accidental displacement.

Figure 1:
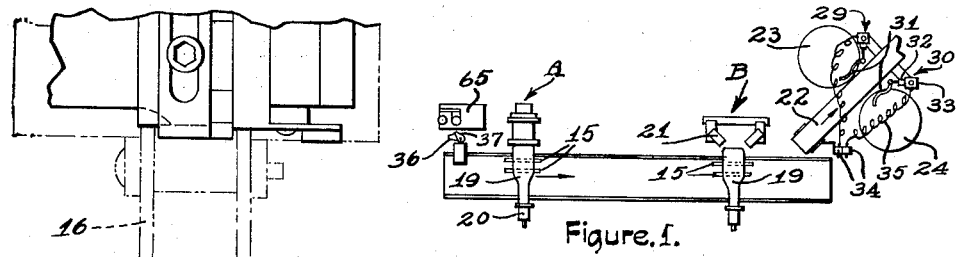
Fig. 1 is more or less a diagrammatic fragmentary top plan view of glassware handling apparatus incorporating our invention.

Fundamentally the mechanism incorporating our invention resembles the devices disclosed in W. J. Fedorchak et al. patents, No. 2,352,091 issued June 20, 1944, and No. 2,682,802 issued July 6, 1954, both having been assigned to the assignee of the present application. In the earlier Fedorchak patent, the apparatus is designed for "mechanical checking" to detect choked necks and that sort of imperfection, whereas the later Fedorchak patent functions to detect crizzles, checks and the like and falls in that category herein defined as "optical checking." In both of these patents, the articles being inspected occupy normal upright positions in contrast with the horizontal or recumbent positioning of the articles in accordance with the present invention. Otherwise, the basic principle involved in the inspecting operation is the same in the several patents and this application.

According to the illustrated embodiment of our invention, it includes an endless series of article supporting cradles 15 mounted upon an endless chain 16 which is trained over a pair of sprockets 17, the latter being spaced apart horizontally and supporting the cradles and chain in such fashion that it includes an upper horizontal reach 18 upon which the glass articles to be inspected are carried. This chain and the attached cradles are moved intermittently by any preferred means (not shown) so that the bottles or jars occupying recumbent positions in the cradles 15 are brought into succession to inspecting stations spaced apart along the free reach of the conveyor. At one of these stations A (Fig. 1) a plug gauge 20 may be projected into the neck opening to gauge the same while at a later station B an "optical checking" device 21 may function to scan preselected areas of the container for the purpose of detecting crizzles, checks and such imperfections. Other devices (not shown) are positioned between the units A and B (Fig. 1) for the purpose of detecting other specific kinds of defects that might exist in the glassware. As has been explained before, we have classified these various defects in two distinct groups, one of which is restricted to the inclusion of crizzles, checks and such defects as can be detected reliably, if at all, only by so-called optical inspection. All other specific forms of defects fall in the second group, or classification.

Figure 2:
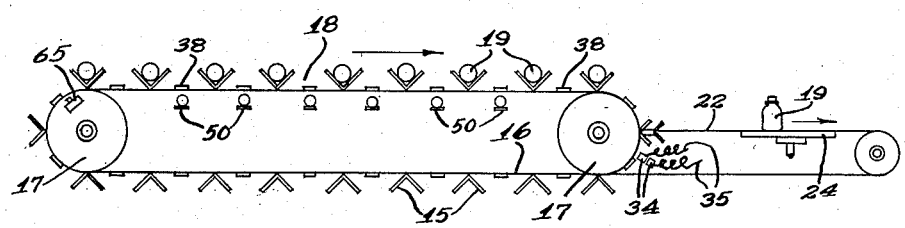
Fig. 2 is a more or less diagrammatic side elevational view.
Figure 4:
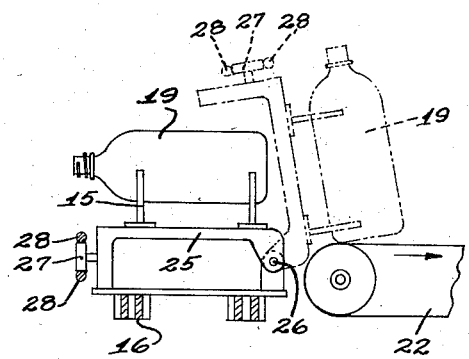
Fig. 4 is a fragmentary section elevational view illustrating somewhat diagrammatically the transfer of a bottle from the main conveyor to a distributing conveyor.

By reference to Figs. 1, 2 and 4, it will be observed that the cradles 15 bring the articles in succession to a transfer position where such cradles tilt substantially to the dotted line position indicated in Fig. 4 for the purpose of placing the bottles or jars upright upon a distributing conveyor 22, the upper article supporting reach of which is disposed horizontally and extends between and beyond a pair of accumulator tables 23 and 24. One of these accumulator tables is intended to receive defective ware selected by "optical checking" while the other table accumulates only articles containing defects detectable by "mechanical checking." Referring for a moment to Fig. 4, it will be noted that each cradle 15 is mounted upon a pivoted holder 25, the latter being hinged to a horizontal pivot pin 26 at one side of the conveyor. This holder at its free end carries a roller 27 which is confined in a cam-way defined by a pair of rods 28. These rods are bent in such fashion that as each cradle approaches the receiving end of the distributing conveyor 22 it will be moved gradually from the full line position to the dotted line position, shown in Fig. 4, with the result that the container 19 will be deposited upright upon said distributing conveyor.

Owing to the fact that any one of several well-known specific types of defects may necessitate rejection of articles of glassware and that only one kind of defect is detected at each station, it becomes apparent that some means must be provided to insure, first, the removal of defective articles from the distributing conveyor 22, and second, placement of a defective article upon the proper table, to the end that the defective ware will be segregated or grouped in accordance with the general classification of defects explained heretofore. Accordingly, we have provided a so-called "memory device" which in effect memorizes the position of the cradle carrying a defective bottle or jar and functions to operate mechanism to direct such article to one of the accumulator tables 23 and 24, depending, as stated before, upon the specific character of the defect.

Figure 3:
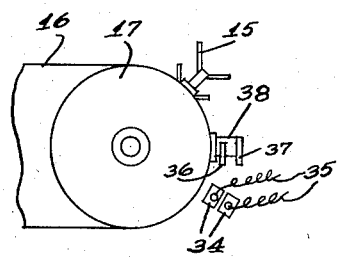
Fig. 3 is a fragmentary side elevational view more or less diagrammatically illustrating one of the bottle supporting cradles, the two microswitches and one of the series of microswitch actuators.

For the purpose of directing defective articles from the distributing conveyor 22 to one or the other of the accumulator tables 23 and 24, we have provided each accumulator with a deflector unit 29 or 30. Each of these units consists of a deflector arm 31 carried by a piston type motor 32 under the control of an electrical solenoid valve 33. A microswitch 34 is connected to each solenoid valve 33 by means of a conductor 35. The two microswitches 34 (Figs. 1, 2 and 3) are positioned in proximity to but slightly beyond the article transfer station and are intended to be selectively actuated by devices individual to and moving with the several cradles 15.

Figure 5:
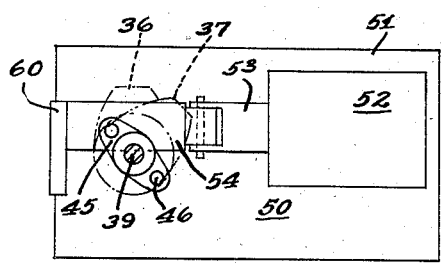
Figs. 5 and 6 are schematic plan views of the electric solenoid unit which pre-positions the microswitch actuator in response to the detection of choked necks, out-of-round finishes, etc.

Each of these devices comprises essentially two cam lobes 36 and 37, or fingers (Figs. 5, 9 and 10), formed on a collar 38, the latter pinned to a vertical rock shaft 39 which is journaled in a bearing 40. These cam lobes or fingers are spaced apart axially of the collar 38 a distance approximating the spacing apart of the microswitches 34 and in that relationship illustrated have their radial center lines spaced apart circumferentially approximately 45°. The aforementioned bearing 40 is carried by a base plate 41 which is suitably attached to the conveyor chain 16. This base plate also carries an upstanding flange 42 in which is mounted a spring detent 43 including a ball designed for reception in one of three peripheral recesses 44 formed in the collar 38 at circumferentially spaced points. The function of this detent and the recesses (Figs. 5–9) obviously is to releasably hold the collar 38 in any one of three positions, one of which is a neutral position occupied so long as the glassware is marketable, while the second position is that occupied by the lobe or finger 37 following detection of a defect by "mechanical checking," and the third position being that of the lobe 36 immediately following detection of crizzles or checks as a result of "optical checking."

Secured to the lower end of the rock shaft 39 is a pin carrier 45 which supports a pair of diametrically opposed pins 46 extending downwardly parallel to the axis of the rock shaft 39. These pins are intended to be engaged by an actuator 50 for the purpose of shifting the collar 38 about its axis and bringing one or the other of the lobes 36 and 37 to a microswitch actuating position in the event of detection of a defect in an article of glassware at one of the inspecting stations. In the event a defect is detected at one of the "mechanical checking" stations, the actuator engages the pins 46 to move the cam lobes through an angle of 45° and thereby position the upper lobe 37 so that it will actuate that microswitch which controls the deflector arm associated with the accumulator table 24. Such positioning of the lobe 37 takes place irrespective of the specific type of defect encountered with the exception of those defects which must be detected by "optical checking." In the event no defects in the container are detected prior to arrival at the optical checking station B, for example, and at this station the scanning device detects a crizzle or check, then the actuator 50 moves the lobes through an angle of 90° in a clockwise direction thereby bringing the lower lobe 36 into such position that it will, at the proper time, operate that microswitch 34 which will cause projection of the deflector arm required to direct this specific article to the other accumulator table 23. In order that defective ware can be transferred to one or the other of these accumulator tables 23 and 24, it is necessary that the proper spaced relationship between the point of placement of the containers on the distributing conveyor 22 and the location of the two microswitches 34 be very definitely established and maintained. The proper microswitch must be operated just prior to arrival of a defective article at a point near the accumulator tables. Another factor is the lineal speed of travel of the distributing conveyor 22. These, however, are mere matters of design and good engineering.

There is an actuator 50 at each of the inspecting stations A and B and any intermediate stations, designed to operate in response to the detection of a defective container at any of these stations for operatively positioning one or the other of the lobes or fingers 36 and 37 in the fashion dictated by the particular kind of defect encountered. Each actuator is connected by means (not shown) to the plug gauging device 20 at the inspecting station A or the "optical checking" device 21 at station B so that when either of the latter devices detects a defect in the container being inspected, it in turn causes functioning of the actuator 50. The purpose of each actuator 50, as is apparent, is to place one of the lobes 36 and 37 in a position to actuate one of the two microswitches 34 so that the defective container ultimately will find its way either to the table 23 or 24, depending again upon the particular group in which the specific defect has been classified.

In general, the actuators 50 are identical in construction in that each includes a base plate 51 carrying a conventional solenoid 52 and armature 53, the outer end of the latter being connected to a slide 54. This slide 54 has a depending tongue 55 projecting into a guideway 56 in which a guide rod 57 is mounted and extends lengthwise of the slide 54. This rod also extends through an opening in the depending finger 55 of the slide 54 and secures these two elements together in sliding relationship. A coil spring encircles this rod 57 and yieldingly holds the slide 54 in its most remote position from the solenoid. The slide 54 is so positioned that normally it will not interfere with the advancing movement of the series of microswitch operating means as the latter enter and leave the several inspecting stations. To the extent just described, all of the actuators are of identical structure and operate in the same fashion. It is obvious, however, that since the lobes 36 and 37 must be moved only through an angle of 45° where one type of defect has been detected, but are moved through an angle of 90° in the event of detection of another kind of defect, it is necessary that the slides 54 be of two different lengths and carry differently formed flanges or fingers at their outer ends for engagement with the pins 46.

Figure 9:
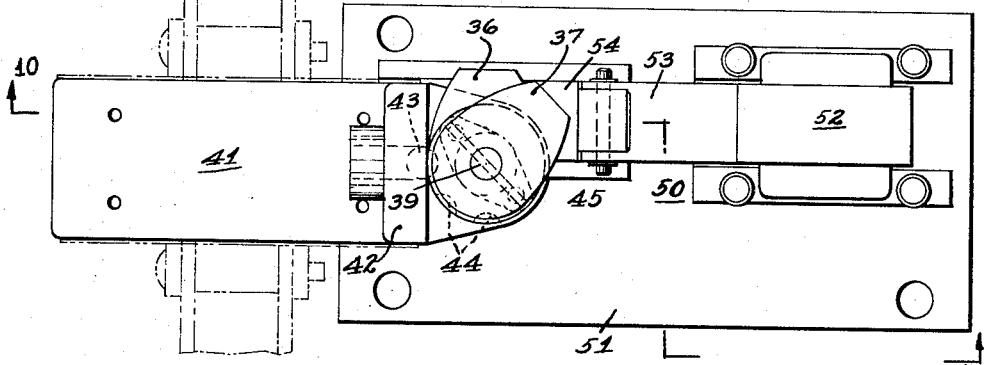
Fig. 9 is a detail top plan view of one of the electrical solenoid units.
Figure 7:
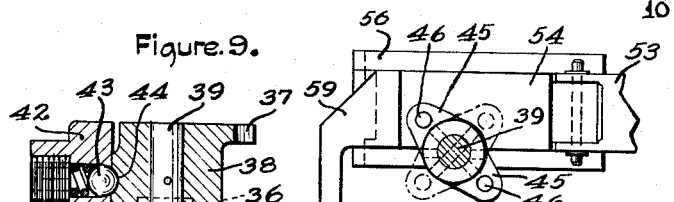
Figs. 7 and 8 are views somewhat similar to Figs. 5 and 6 but show the electric solenoid unit which is mounted at each of the inspecting stations at which crizzles, checks and the like defects are intended to be optically detected. These views are taken substantially at the plane of line X—X of Fig. 10.
Figure 10:
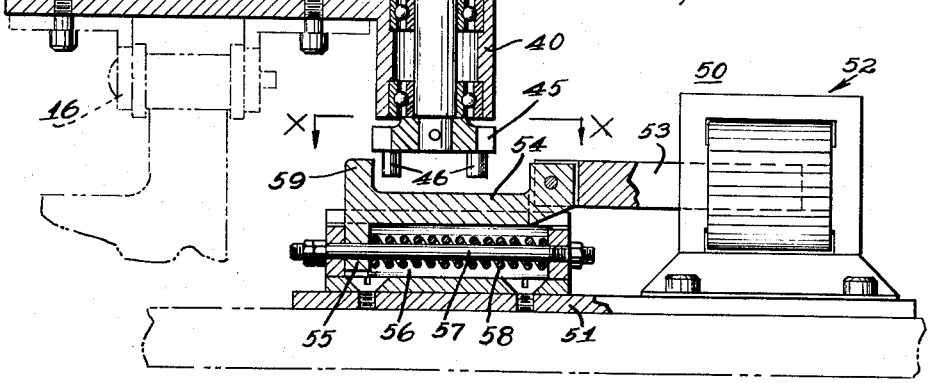
Fig. 10 is a sectional side elevational view taken substantially along the plane of line 10—10 of Fig. 9.
Figure 8:
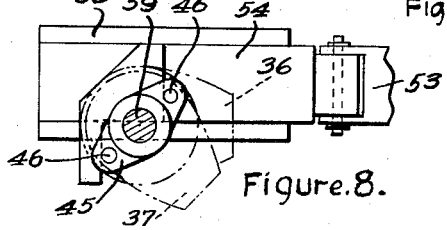

Optical checking in the event an optical defect has been detected requires movement of the lower lobe 36 through an angle of 90° from its normal inoperative or neutral position. The neutral starting position of this lobe is shown in Fig. 9 while its operating position is indicated in dotted lines in Fig. 8. In this instance and to the end that rotation of the pin carrier 55 will be terminated at the proper point, a generally inverted L-shape flange 59 is provided at the outer end of the slide 54 (Fig. 8) so that when the lobe 36 assumes its operating position both of the pins 46 will be firmly engaged by the flange 59. Thus, the slide 54 cannot move any further to the right (Figs. 8 and 10) and one of the recesses 44 in the lobe carrying collar 38 will have been brought into register with the spring-pressed detent 43.

Figure 6:
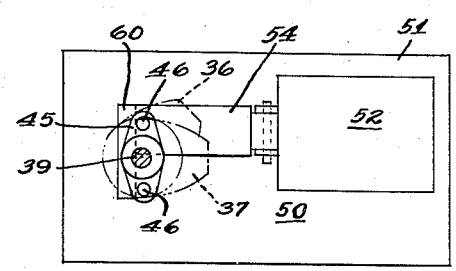

In the event the container being inspected contains a defect which is detectable by "mechanical checking," then the microswitch operating lobes 36 and 37 must be moved through an angle of only 45° so as to position the upper lobe 37 as indicated in Fig. 6. For this purpose, the outer end of the slide 54 is formed with a straight transverse flange 60, which, incident to movement of the slide in opposition to the pressure of spring 58, first moves the pin carrier 45 through an angle of 45° and thereupon engages both of the pins 46. Thus, the solenoid is incapable of causing any further longitudinal movement of the slide 54 and the flange 60, by reason of the indicated contact with both of the pins 46, also prevents any further rotary motion of the lobes. At this point, the spring-pressed detent 43 is releasably engaged with the intermediate recess 44 in the collar 38.

In operation, the bottles or jars 19 are placed upon the cradles at the left hand end of the upper reach (Figs. 1 and 2) in recumbent positions. These cradles move in step-by-step fashion so that each container is held stationary momentarily at each inspecting station. The lobes 36 and 37 normally are positioned as shown in Fig. 9 and so remain, so long as the articles being inspected are free from detectable defects. Such glassware will be transferred to the distributing conveyor 22 and carried thereby to a packing station. In the event detectable defects are present, one or more of the inspecting devices is actuated and in turn causes such positioning of one or the other of the lobes 36 and 37 that just beyond the unloading station it will operate one of the microswitches and effect projection of one of the deflectors 31 over the distributing conveyor 22. Thus the defective article will move onto one of the accumulator tables 23 and 24. Following operation of one of the microswitches by one of the lobes 36 and 37 and prior to the latter returning to the loading end of the upper reach, these lobes must be returned to their normal or neutral position. Such is obtained by a cam reset device 65 (Figs. 1 and 2).

Modifications may be resorted to within the spirit and scope of the appended claims.

We claim:

1. In apparatus of the character described an endless series of intermittently moving cradles adapted to support glass containers in recumbent positions and carry them in succession to a plurality of horizontally spaced container inspecting stations and thence to an unloading station, a horizontal distributing conveyor having a receiving end positioned at the unloading station, means for tilting the cradles and thereby transferring containers supported thereon to upright positions upon the conveyor at said unloading station, accumulator tables for defective containers at opposite sides of the distributing conveyor, one table adapted to receive containers having defects falling in one general classification and the other table adapted to receive containers having defects of another distinctive general classification, container deflectors individual to and normally overlying the tables and movable one at a time to a position over the conveyor to direct selected defective containers to said tables, an air motor supporting and operable to so move each deflector, an electric solenoid valve individual to and for controlling the delivery of air under pressure to each motor, microswitches individual to and electrically connected to the solenoid valves for controlling operation of the latter, a self-contained defect detecting unit at each inspecting station, microswitch operators individual to and traveling with the cradles and normally occupying neutral positions but movable to alternate positions each so related to one of the microswitches as to operate by means of said microswitch a selected one of said deflectors when the container in the cradle associated with said operator reaches said deflectors and an actuator for each detecting unit operable in response to the detection by a unit of a specific kind of a defect in a container for moving a microswitch operator to a preselected operative position in which it will actuate the microswitch which upon actuation causes operation of the deflector that directs containers to the table whereon containers having the detected defect are classified, thereby to direct the containers having said specific kind of defect to said last named table.

2. Apparatus as defined in claim 1 comprising a hinged swingable carrier for each cradle and means common to all of the cradles for swinging the carriers about an axis generally parallel to the direction of cradle travel between article supporting and unloading positions.

3. Apparatus as defined in claim 1, each said microswitch operator comprising a pair of cam lobes mounted upon a common axis at longitudinally spaced points therealong and spaced apart circumferentially, said lobes being shiftable as a unit about their common axis to and from their operating position.

4. In apparatus as defined in claim 3 a rock shaft supporting the cam lobes, a pin carrier secured to said shaft, and a pair of diametrically opposed pins on the carrier positioned for engagement with said actuators.

5. In apparatus as defined in claim 3, a collar carrying the cam lobes, and spring detent means for releasably holding the collar in any one of several angular positions.

6. Apparatus as defined in claim 1 each fixed actuator comprising an electric solenoid, a slide operable by the solenoid, and means forming a part of the slide for prepositioning the microswitch operators.

References Cited in the file of this patent

UNITED STATES PATENTS

| | | |
|---|---|---|
| 1,373,605 | Eberly | Apr. 5, 1921 |
| 2,339,638 | Henszey et al. | Jan. 18, 1944 |
| 2,352,091 | Fedorchak et al. | June 20, 1944 |
| 2,682,802 | Fedorchak et al. | July 6, 1954 |